United States Patent
Ge et al.

[11] Patent Number: 5,647,713
[45] Date of Patent: Jul. 15, 1997

[54] PLASTIC PANEL FASTENER AND METHOD OF FORMING THE SAME

[75] Inventors: Yao Ge, Clinton Township; David J. Krysiak, Pleasant Ridge, both of Mich.

[73] Assignee: TRW Inc., Cleveland, Ohio

[21] Appl. No.: 651,756

[22] Filed: May 22, 1996

[51] Int. Cl.$^6$ .............................. F16B 19/00; B29C 43/22
[52] U.S. Cl. .................. 411/509; 411/913; 24/324; 24/662; 264/274; 425/129.1
[58] Field of Search ................... 411/508, 509, 411/510, 913; 24/324, 585, 662; 264/274, 279.1; 425/127, 129.1

[56] References Cited

U.S. PATENT DOCUMENTS

| | | |
|---|---|---|
| 3,202,749 | 8/1965 | White ........................... 425/129.1 |
| 3,309,096 | 3/1967 | Inka ........................... 24/662 X |
| 4,176,428 | 12/1979 | Kimura . |
| 4,420,859 | 12/1983 | Hammerle ........................ 24/585 |
| 4,668,145 | 5/1987 | Hirohata . |
| 4,716,633 | 1/1988 | Rizo . |
| 4,778,320 | 10/1988 | Nakama . |
| 5,301,396 | 4/1994 | Benoit . |
| 5,341,544 | 8/1994 | Richter et al. . |
| 5,507,610 | 4/1996 | Benedetti et al. .............. 411/509 X |

*Primary Examiner*—Neill R. Wilson
*Attorney, Agent, or Firm*—Fay, Sharpe, Beall, Fagan, Minnich & McKee

[57] ABSTRACT

A panel fastener includes separable components formed from two different plastics, one relatively rigid and the other somewhat more flexible and resilient. The two components are formed in a two shot injection molding process and are joined through a ball and socket joint that allows subsequent separation and reconnection.

13 Claims, 3 Drawing Sheets

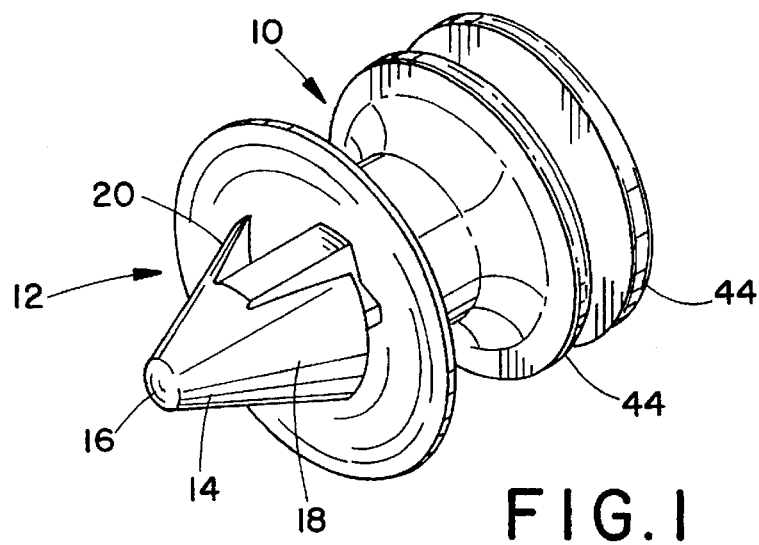
FIG. 1
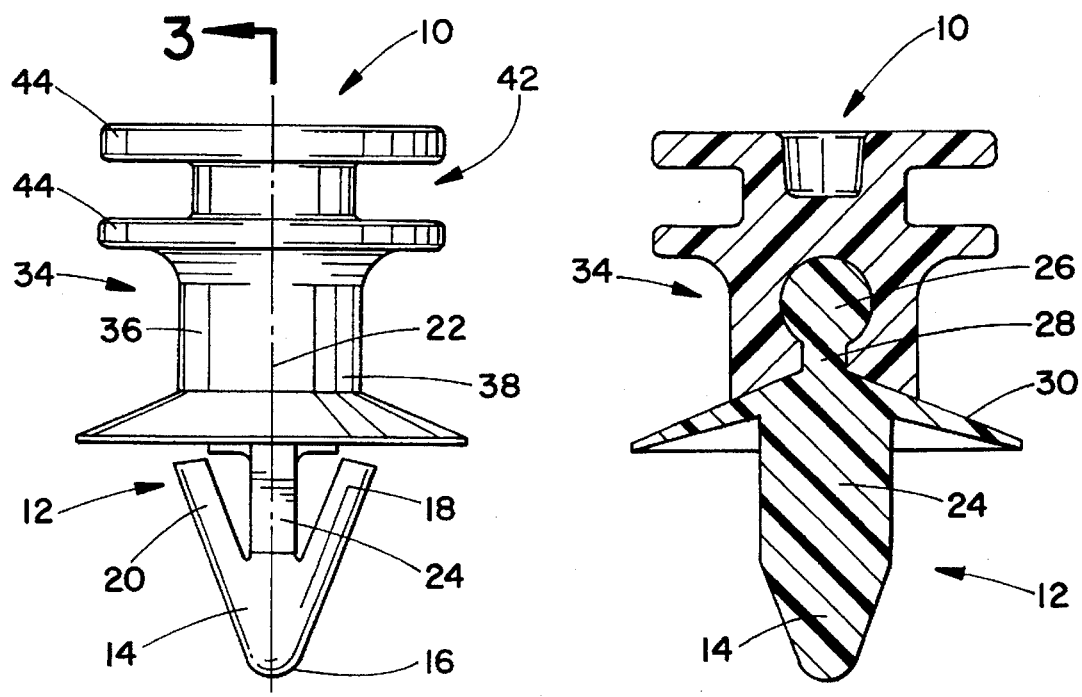
FIG. 2
FIG. 3

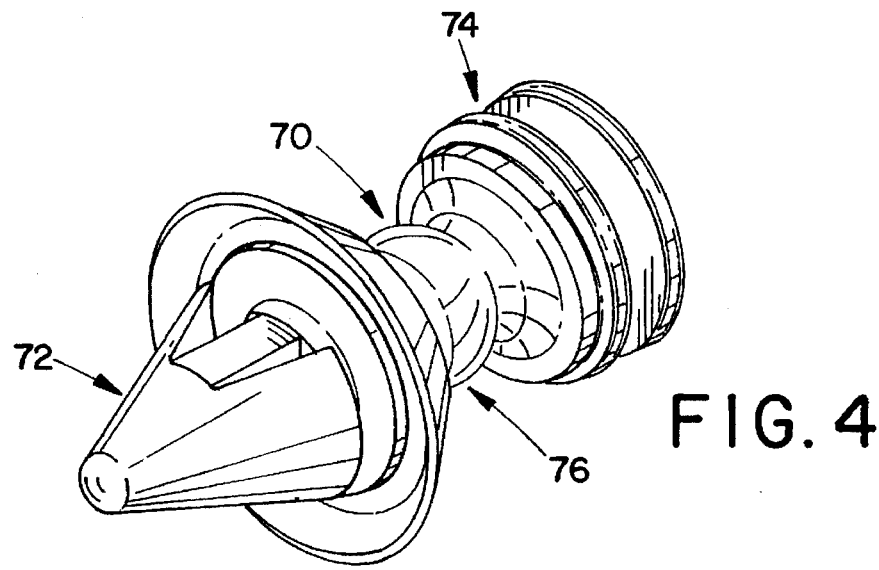
FIG. 4
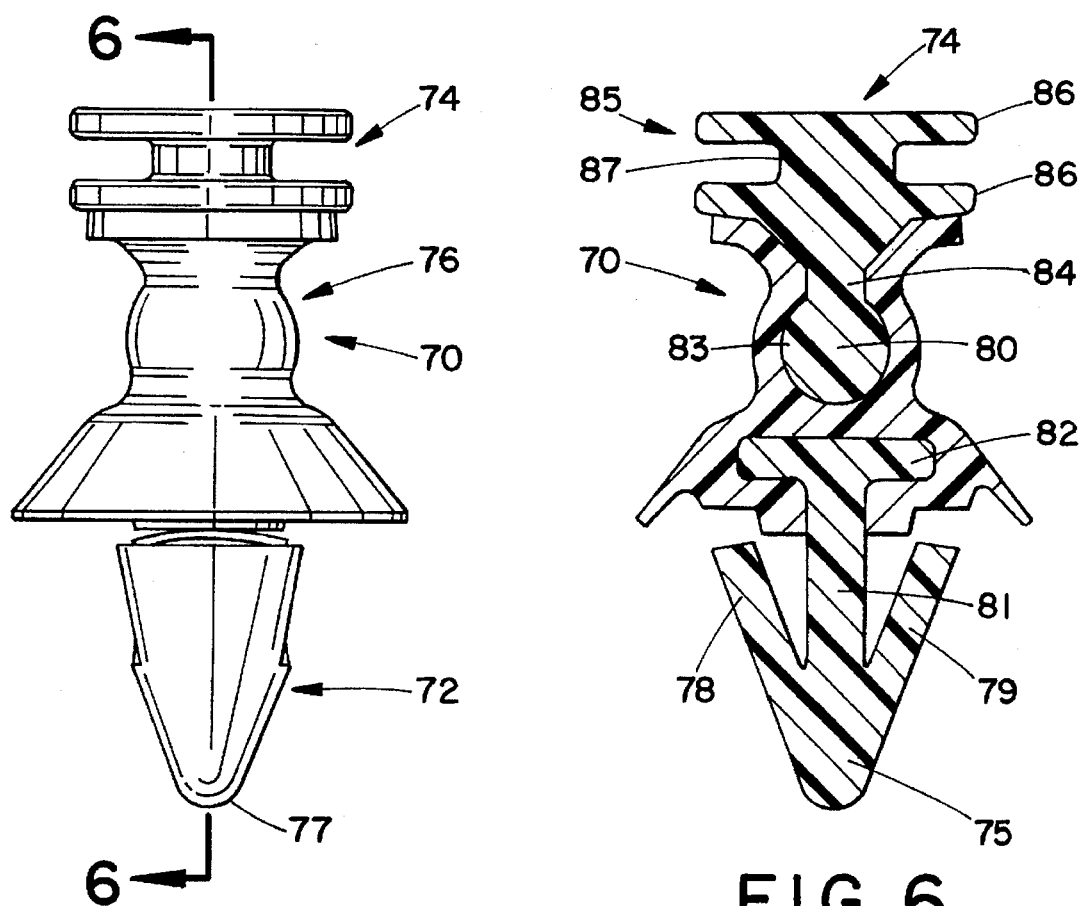
FIG. 5
FIG. 6

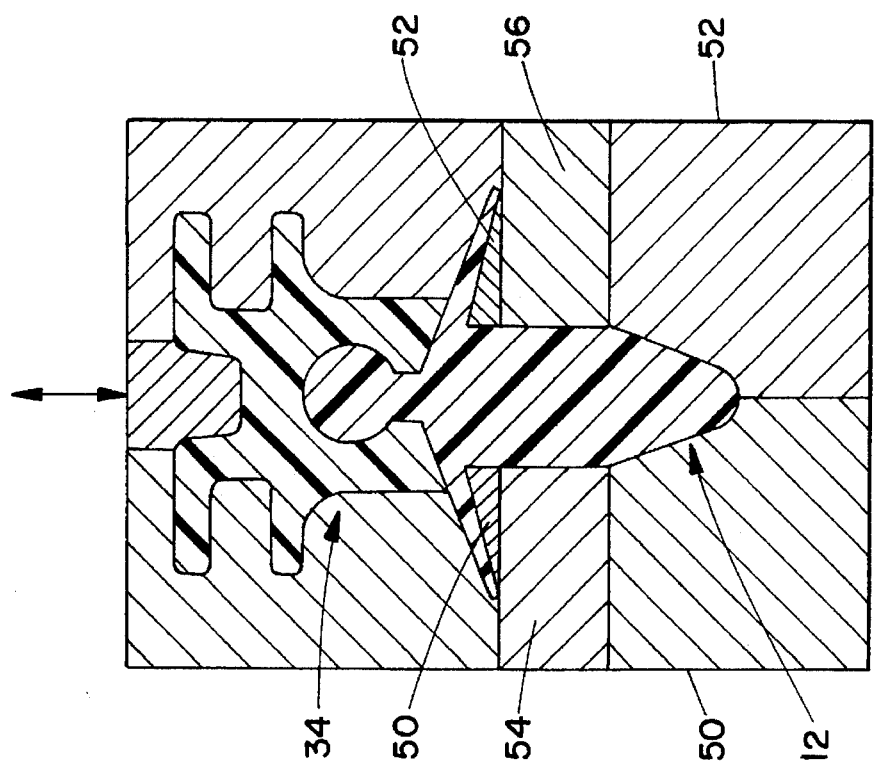
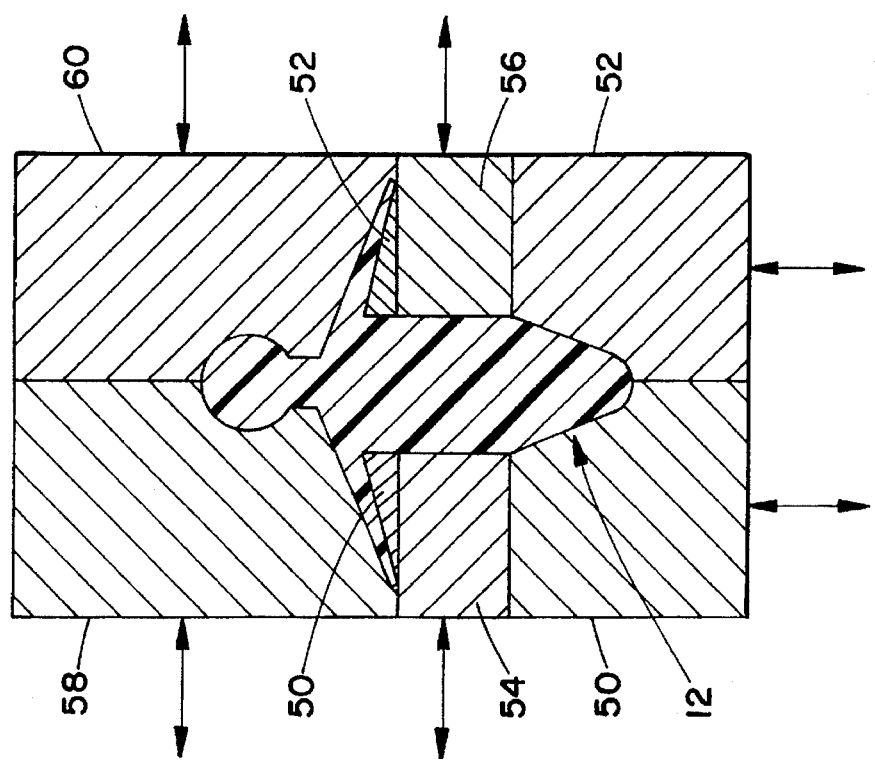

PLASTIC PANEL FASTENER AND METHOD OF FORMING THE SAME

BACKGROUND OF THE INVENTION

The subject invention is directed toward the fastener art and, more particularly, to a fastener assembly for releasably joining panels to associated support panels or frames.

The invention is especially useful in the automotive industry for joining decorative door liner panels to the interior door structure and will be described with reference thereto; however, the invention could be used in other environments and for many different purposes.

The mounting of liner panels to door interiors typically makes use of a fastener assembly comprising cooperating connecting components including a first component having a first end with a male stem for joining in an opening formed in the door interior structure, and a second end providing a receiving a second component. The second component has a mounting head portion for joining to the panel and a retaining end for mechanical retention in the releasable connector of the first component.

The components of the prior assemblies are generally precision injection molded from rigid plastic as two separate pieces. The separate pieces must normally be assembled prior to use. After a liner panel is installed, it can be removed by snapping apart the releasable mechanical connect.

Examples of panel fasteners of this sort are described in U.S. Pat. Nos. 4,176,428; 4,668,145; 4,716,633; and 4,778,320.

While the prior designs are generally satisfactory, the mechanical connection is not as positive as desirable and tends to degrade with use. Moreover, it is inconvenient to mold the fastener system as two separate pieces and then combine or join the pieces following the molding operation.

SUMMARY OF THE INVENTION

The subject invention provides an improved fastener assembly for the purposes described that offers substantial advantages relative to the prior designs. The design effectively produces a single component that can be separated upon servicing. A more positive mechanical connector or interlock results and the interlock does not degrade with multiple uses.

In accordance with the subject invention, there is provided a panel fastener intended for releasably joining a panel member to a support. The fastener generally comprises a first connecting member formed of a relatively hard, rigid plastic and having first and second ends with a male locking shaft extending in one direction to thereby define the first end. The male connecting member is adapted to be received in engaged relationship in an opening in the support. A second connecting member is also formed of a relatively hard, rigid plastic and has first and second ends with a mounting head at its first end for joining to a panel to be supported. In addition, an intermediate body formed of a relatively resilient and pliable plastic joins the second ends of the first and second connecting members. The intermediate body is joined to the second end of one of the first and second connecting members by a releasable connection such as a ball or cone and socket joint.

In its preferred form, the intermediate body is molded in place about the second ends of the first and second connecting members. As can be appreciated, the plastics forming the various members are selected such that actual bonding does not take place when the intermediate body is molded about the second ends of the first and second connecting members.

The intermediate body joining the first two hard plastic bodies permits the structure to effectively be a one-piece design for all original installations and construction. However, separation of the first connecting member from connection with the second connecting member is possible so that the installed panel can be removed and reinstalled merely by a snap release and reconnection of the releasable joint provided by the intermediate body. By forming the intermediate body of the resilient and pliable plastic material, the connection does not degrade with multiple use as was the case with the typical prior designs. Additionally, the intermediate body can be used to form various seals and the like so that, for example, the opening in the support to which the male locking shaft is received can be sealed by the presence of the intermediate member.

In accordance with another aspect of the invention, there is provided a method of forming a panel fastener for releasably joining a panel to a support. The method comprises molding a first connecting member from a relatively hard, rigid plastic to have first and second ends with a male locking shaft forming the first end and adapted to be received in engaged relationship in an opening in the support. The second end is formed to have a ball-like member extending therefrom. A mold chamber is formed about the second end of the first connecting member with the said second end and the ball member constituting an end wall of the mold chamber. Subsequently, a relatively resilient and pliable plastic is supplied to the mold chamber to form a second connecting member molded about the ball member. Preferably, the step of forming the mold chamber includes providing, opposite the end wall constituted by the ball member, a chamber portion for forming a mounting head adapted for connecting to a panel.

It should be appreciated that the plastics used for forming the first and second connecting members are selected so that bonding therebetween does not take place during the step of forming the second member.

The product which results from the above method is, in effect, a unitary, single piece product. However, it can be snapped apart by resiliently deforming the portion of the second component which is molded about the ball member. It can, after being snapped apart, be reconnected merely by forcing the ball into the socket which is complimentary to the ball because of the molding method.

As can be seen from the foregoing, the primary object of the present invention is the provision of a panel fastener which can be readily used for connecting and disconnecting the mounted panel from its position on the associated support.

A still further object is the provision of a method of forming a panel fastener wherein the resulting product can be separated readily, but for all practical purposes, constitutes a single structure for use during installation.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment and method of which will be described in detail in this specification and illustrated in the accompanying drawings which form a part hereof, and wherein:

FIG. 1 is an isometric view showing a first embodiment of panel fastener formed in accordance with the subject invention;

FIG. 2 is a side elevational view of the panel fastener shown in FIG. 1;

FIG. 3 is a vertical cross-sectional view of the panel fastener of FIG. 1 (the view is taken on line 3—3 of FIG. 2);

FIG. 4 is a isometric view of a second embodiment of the panel fastener formed in accordance with the invention;

FIG. 5 is a side elevational view of the fastener assembly of FIG. 4;

FIG. 6 is a vertical cross-sectional view of the panel fastener of FIG. 4 (the view is taken on line 6—6 of FIG. 5);

FIG. 7 is a somewhat diagrammatic view showing a step in the formation of the FIGS. 1–3 embodiment; and, FIG. 8 is a showing of a subsequent step in the formation of the FIG. 1 embodiment.

DETAILED DESCRIPTION OF THE PREFERRED EMBODIMENT

Referring now to the drawings wherein the showings are for the purposes of illustrating the preferred embodiment of the invention only and not for purposes of limiting same, FIGS. 1–3 illustrated a panel fastener 10 formed in accordance with a first preferred embodiment of the invention and generally comprising a first connecting member 12 formed by an injection molding process from a relatively hard, somewhat rigid, and durable polymer plastic such as, for example, nylon. In its preferred form, the first connecting member 12 includes a male locking shaft portion 14 which is of a relatively standard configuration and has an arrowhead-shaped nose end portion 16 which tapers and includes a pair of latch wings 18 and 20 as illustrated. The wings 18, 20 are of identical shape and configuration and are radially resilient relative to the elongated central axis 22 (see FIG. 2). A central rigid shank portion 24 of rectangular cross-section extends into engagement with a second end that is formed as a ball 26 joined to portion 24 by a relatively small diameter neck 28.

Extending radially outward at the juncture between the stem 24 and the neck 28 is a skirt-like, conically shaped flange portion 30 that flares outwardly and downwardly toward the nose 14. Portion 30 in combination with the resilient legs 18, 20 acts to capture the support panel to which the fastener assembly is intended to be connected. That is, the male portion 14 is inserted through an opening in the support panel and the legs 18, 20 flex radially outward to engage behind the panel while the conical skirt-like portion 30 resiliently engages the forward face of the support panel and seals about the opening.

Associated with the first component 12 is a second component 34 which has a generally cylindrical main body 36 including a first end 38 that is shaped and contoured so as to closely surround and completely enclose the neck 28 and the ball member 26 of the first component 12. The outer or second end of the body 36 comprises a mounting head 42 that includes a pair of disk-like members 44. This particular mounting head is of a well known configuration and is arranged so as to allow lateral sliding into edge slots, keyhole openings, and the like formed in a panel to be supported. The second component 34 is formed from a substantially more pliable and resilient plastics material than the first component 12. For example, a material such as Santoprene is preferred, although many other materials could equally well be used provided they have suitable resiliency and other properties which will subsequently become apparent. If the proper material is selected for the second component 34, the two connected components 12 and 34 can be selectively separated by resiliently deforming the second component and snapping the components apart at the mating lines between the ball 26 and the cooperating socket formed by member 34. This allows removal of the supported and installed panel merely by disconnecting the two components. The components can, of course, be reconnected by snapping the ball 26 back into the socket of member 34.

Preferably, the components 12 and 34 are formed using a two-shot molding process so that the resulting product does not have to be manually assembled after formation of the components. FIGS. 7 and 8 diagrammatically illustrate the preferred method of forming the fastener assembly 10. In particular, as illustrated in FIG. 7, a suitable mold chamber is formed from multiple components including a first pair of mold components 50 and 52 arranged and configured so as to each form substantially half of the male stem portion 14. Additionally, laterally slidable mold or die portions are arranged so as to form the open spaces between the legs and the stem 24. These elements 54 and 56 are, of course, independently movable relative to portions 50, 52 in which they are carried. At the upper end of the diagrammatic showing are a pair of cooperating mold halves 58 and 60 which form the chamber that defines the upper surface of the skirt-like portion 30 and the neck 28 and head 26.

The first shot or injection of the more rigid plastic is made into the chamber thus defined to form the first component 12. The injection port or ports are not shown in the drawings.

Subsequently, the mold components 58, 60 are moved aside and new components moved into position from, for example, a position rotated 90° from the path of movement of mold halves 58, 60. These new components are illustrated broadly in FIG. 8 and are shaped and contoured so as to form the main portion of a mold chamber which defines the component 34. One end of this mold chamber is, however, defined by the upper end surface of the component 12. Consequently, when the second shot or injection of the more resilient plastic is made into the chamber thus defined, actual molding of the component 34 in final assembled position relative to component 12 takes place as shown in FIG. 8. It should be appreciated that this can only be accomplished by selecting plastics which do not bond and adhere to one another and by maintaining proper molding temperatures and conditions so that such bonding will not take place. The resulting product is effectively a one-piece product insofar as handling and inventory is required. No further assembly of the two separate parts is required.

FIGS. 4 through 6 illustrate a second embodiment of the fastener incorporating further aspects of the invention. In this embodiment, the assembly is indicated generally with the reference number 70 and comprises a first component 72, a second component 74, and an intermediate connecting component 76. The first component 72 is formed much in the manner of component 12 of the embodiment of FIGS. 1–3. That is, it is injection molded from a relatively rigid plastic or polymer such as nylon and includes a male shank portion 75 that terminates in a nose 77. A pair of laterally spaced wings 78 and 79 are arranged for resilient lateral deflection relative to the center axis 80. At the upper end of the shank 81, there is a T-like head portion 82.

The second component 74 is also injection molded from a suitable, relatively rigid plastic or polymer such as nylon and is provided with a first ball-shaped end 83 connected by a neck 84 to a second end that defines a mounting head 85. The mounting head 85 is of the same design as the mounting head 42 of embodiment of FIGS. 1 through 3. That is, it includes a pair of spaced, disk-like members 86 connected by an intermediate cylinder portion 87. Joining the first and second body portions 72, 74 is the previously-mentioned intermediate connecting section 76. This section 76 is molded in place between the first and second components. Additionally, it is formed from an elastomeric, resilient, and flexible material such as the previously-mentioned Santoprene. It is provided at its lower end with a radially extending skirt-like portion to act as a seal about the opening into which the male stud or shaft 75 is mounted. At the upper end, it closely encloses the ball member 83 and allows a snap-apart arrangement to be achieved in the manner previously described with respect to the FIGS. 1 through 3 embodiment.

Forming of the embodiment of FIGS. 4 through 6 preferably is accomplished through a two-shot molding process of the nature described with respect to the FIGS. 1-3 embodiment. That is, the mold is arranged so as to form the first two components simultaneously and then, through the use of removable sections, a mold is defined about the end 82 and the ball 83 so that these portions act as the end portions of the intermediate mold chamber into which the second shot of the more resilient plastic is made.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A panel fastener for releasably joining a panel to a support comprising:

a first connecting member formed of a relatively hard rigid plastic and having first and second ends with a male locking shaft forming its first end and adapted to be received in locking relationship in an opening in said support;

a second connecting member formed of a relatively hard rigid plastic and having first and second ends with a mounting head on its first end, said mounting head adapted to join to a panel; and, an intermediate body formed of a relatively resilient and pliable plastic joining the second ends of the first and second connecting members, said intermediate body joined to the second end of one of the first and second connecting members by a releasable ball and socket joint.

2. A panel fastener as set forth in claim 1 wherein the intermediate body is joined by a non-releasable connection to the second end of one of the first and second connecting members.

3. A panel fastener as set forth in claim 1 wherein the intermediate body section has a socket on one end which receives a ball on the second end of the second connecting member to thereby form said ball and socket joint.

4. A panel fastener as set forth in claim 2 wherein the non-releasable connection comprises a portion of the intermediate body molded about the second end of one of the first and second connecting members.

5. A panel fastener as defined in claim 1 wherein said first and second connecting members are each formed from the same plastic.

6. A panel fastener as defined in claim 1 wherein said first and second connecting members.

7. A panel fastener as set forth in claim 1 wherein the intermediate is injection molded in place to the second ends of the first and second ends of the first and second connecting members.

8. A panel fastener for releasably joining a panel to a support comprising:

a first connecting member formed from a relatively hard rigid plastics material, said first connecting member having oppositely disposed first and second ends and including a male locking shaft extending from its first end, said male locking shaft adapted to be received in locking relationship in an opening in said support;

a second connecting member formed from a relatively hard rigid plastics material, said second connecting member having oppositely disposed first and second ends and including a mounting head on its first end, said mounting head including connecting means for joining said first end to a panel;

an intermediate connecting body joining the second ends of the first and second connecting members, said intermediate member being formed from a relatively resilient and pliable plastics material molded in place about the second ends of the first and second connecting members and joining with at least one of the first and second connecting members with a releasable ball and socket joint.

9. A panel fastener as set forth in claim 8 wherein the intermediate connecting member includes a radially extending shirt-like portion adjacent the first end of the first connecting member.

10. A panel fastener as set forth in claim 8 wherein the intermediate connecting member includes a conically shaped shirt-like portion that is located at the end remote from the releasable ball and socket joint.

11. A method of forming a panel fastener for releasable joining a panel to a support comprising the steps of:

a) molding a first connecting member from a relatively hard rigid plastic to have first and second ends with a male locking shaft extending from its first end adapted to be received in an opening in said support, said second end being formed with a ball member extending therefrom;

b) forming a mold chamber about the second end of the first connecting member with the said second end and the ball member constituting an end wall of said mold chamber;

c) injecting a relatively resilient and pliable plastic into the said mold chamber to form a second connecting member molded about the ball member.

12. The method as set forth in claim 11 wherein the step of forming the mold chamber includes providing opposite the end wall constituted by the ball member a chamber portion for forming a mounting head adapted for connection to a panel.

13. The method as set forth in claim 12 wherein the plastics used for forming the first and second connecting members are selected so that bonding therebetween does not take place during the step of forming the second connecting member.

* * * * *